April 25, 1967
F. M. KNIGHT
3,316,017
SAFETY SEAT BELT
Filed July 28, 1965
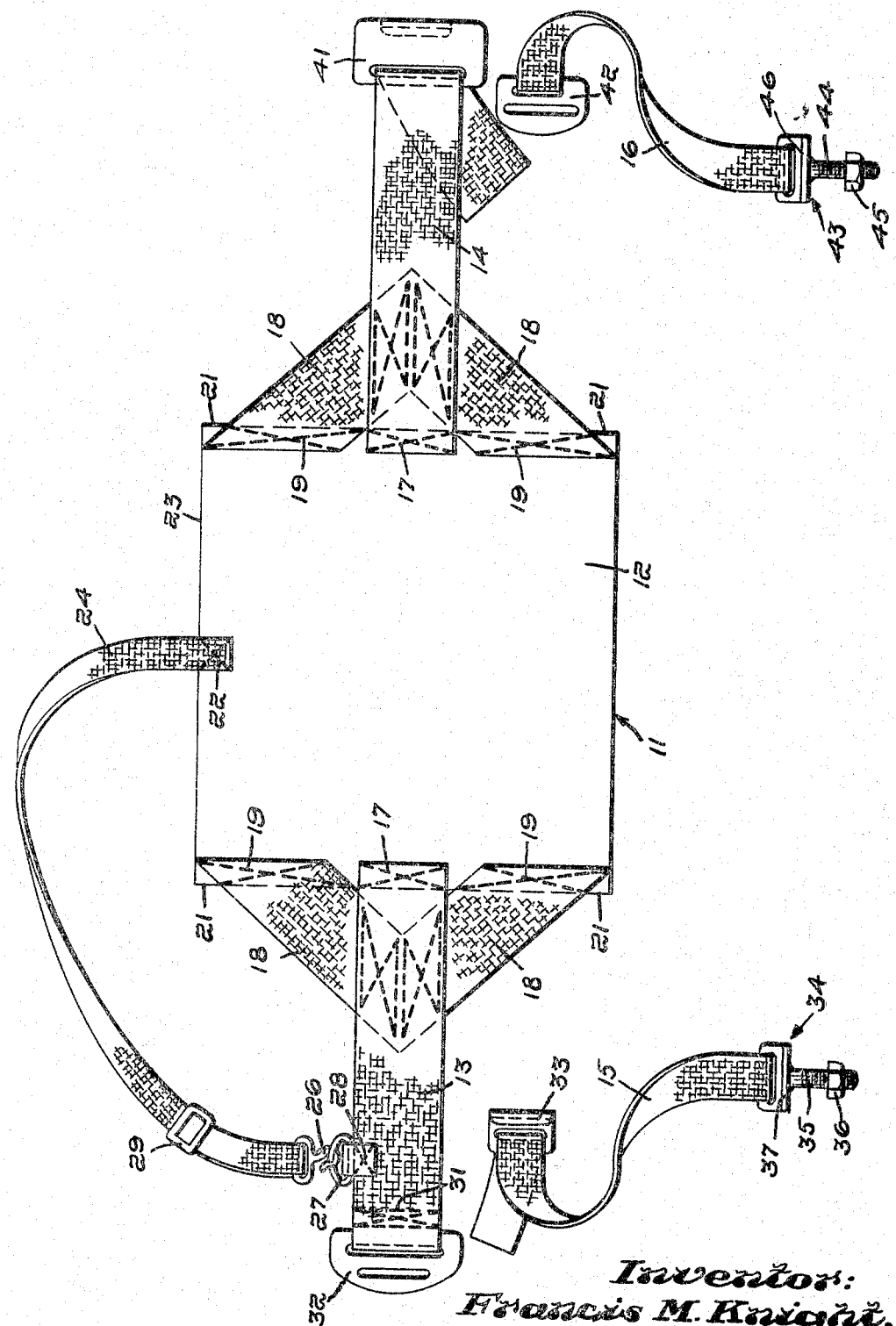
Inventor:
Francis M. Knight,
by John E. Toupal
Attorney

United States Patent Office 3,316,017
Patented Apr. 25, 1967

3,316,017
SAFETY SEAT BELT
Francis M. Knight, 28 Reed St.,
Marblehead, Mass. 01945
Filed July 28, 1965, Ser. No. 475,408
15 Claims. (Cl. 297—385)

The present invention relates generally to safety seat belts for use in automotive vehicles, airplanes, etc. The invention is particularly useful for women during a period of pregnancy.

Safety seat belts have in recent years come into extensive use. Large scale commercial marketing programs in addition to persuasive appeals by national and state safety organizations have rendered their use a habit pattern for a great many motorists and, of course, their use by airline passengers has long been mandatory. The contribution of safety seat belts in the saving of lives and reduction or mitigation of injuries has been conclusively demonstrated by both simulated accident tests and detailed accounts of actual accidents.

While the overall usefulness of safety seat belts is not questioned there is evidence of certain problems associated with their use. One such problem is the occurrence of seat belt induced internal injuries during a vehicle collision accident. The injuries result from application of the full deceleration force to the vital portion of the user's anatomy which is in contact with the relatively small surface area exhibited by conventional seat belts. This problem is particularly acute when the belt user is a pregnant woman. Medical evidence has recently established the occurrence of traumatic rupture of a pregnant uterus and death of the fetus as a result of seat belt exerted pressure during an automobile accident. Furthermore, existing seat belts cannot be comfortably and conveniently worn by women experiencing the abdominal distension of pregnancy.

The object of this invention therefore is to provide an improved safety seat belt which can be safely and comfortably utilized by women during periods of pregnancy.

One feature of this invention is the provision of an elongated safety seat belt having a relatively elastic length portion adapted to conform to the curvature of the abdomen and a relatively nonelastic length portion providing the composite belt with a modulus of elasticity within the maximum limits required for safety seat belts.

Another feature of this invention is the provision of a safety seat belt of the above featured type wherein the elastic length portion is attached between two separate nonelastic length portions and has a relatively large width which increases the area of belt in surface contact with the user's abdomen.

Another feature of this invention is the provision of a safety seat belt of the above featured types wherein the nonelastic length portions are of lesser width and are aligned with the longitudinal axis of the straddled elastic portion.

Another feature of this invention is the provision of a safety seat belt of the above featured type including support bands which are attached between the nonelastic length portions and the laterally extending edges of the elastic length portion so as to distribute the exerted longitudinal stress and prevent deformation of the elastic portion.

Another feature of this invention is the provision of a safety seat belt of the above featured type including an adjustable shoulder strap which is connected between one nonelastic length portion and the longitudinal edge of the elastic length portion and prevents distortion thereof.

Another feature of this invention is the provision of a safety seat belt of the above featured types wherein the combined length of the nonelastic length portions is substantially greater than the length of the elastic portion thereby permitting attainment of a relatively low modulus of elasticity for the composite belt.

Another feature of this invention is the provision of a safety seat belt of the above featured type including mechanisms for adjusting the length of each nonelastic length portion enabling a user to properly center the central elastic portion.

Another feature of this invention is the provision of a safety seat belt of the next above featured type wherein the free end of one nonelastic length portion terminates in a buckle tab adapted for attachment with a seat belt buckle and the free end of the opposite nonelastic portion terminates in a belt buckle adapted for attachment with a buckle tab thereby permitting the device to be utilized with a conventional safety belt already installed in a vehicle.

These and other objects and features will become more apparent upon a perusal of the following specification taken in conjunction with the accompanying drawing which shows a preferred embodiment of the invention.

Referring to the drawing there is shown the elongated restraining belt 11 having the central length portion 12 composed of a relatively elastic material and the straddling end length portions 13 and 14 composed of a relatively nonelastic material. The belt 11 also includes the auxiliary length portions 15 and 16 removably connectable to length portions 13, 14 and also composed of a relatively nonelastic material.

The nonelastic length portions 13, 14 are attached by stitching 17 to the edge of the elastic portion 12 in alignment with the longitudinal axis thereof. The support bands 18 are attached by stitching 19 between the nonelastic portions 13, 14 and the elastic portion edges 21 which extend laterally from the attachments 17.

Attached by stitching 22 at the middle of the upper longitudinal edge 23 of the elastic portion 12 is one end of the shoulder strap 24. The opposite end of the shoulder strap 24 terminates in the hook 26 which is connectable to the ring 27 secured to the nonelastic portion 13 by stitching 28. The length of the shoulder strap 24 can be adjusted by the adjustment ring 29.

Attached by stitching 31 to the free end of the nonelastic portion 13 is the buckle tab connector 32. The tab 32 is adapted for a fixed connection with the adjustable buckle 33 attached to one end of the auxiliary nonelastic length portion 15. Secured to the opposite end of the auxiliary nonelastic portion 15 is the connector 34 which includes bolt 35, the securing nut 36 and the pressure plate 37. The free end of the nonelastic portion 14 terminates in the conventional seat belt buckle 41 which is connectable to the buckle tab connector 42 on one end of the auxiliary nonelastic portion 16. The opposite end of the nonelastic auxiliary portion 16 is also secured to a connector 43 having a bolt 44, securing nut 45 and pressure plate 46.

In a preferred embodiment of the invention the elastic length portion 12 is composed of multiple elastic material layers comprising both rubber and fabric constituents, has a length of about 10 inches and a width of about 9 inches. The nonelastic length portions 13, 14, 15 and 16 are composed of conventional 2-inch width nylon seat belt and the stitching 17, 19, 22, 28 and 31 is done with high strength nylon thread. The length of each nonelastic portion 13, 14 is approximately 10 inches while the auxiliary nonelastic portions 15, 16 each have a length of about 24 inches. The shoulder strap 24 is also composed of nylon belting and has a width of approximately 1 inch.

To use the belt 11 the auxiliary length portions 15 and 16 are installed in the conventional manner with the bolt connectors 34 and 43 secured to the body of a vehicle (not shown). The free ends of the auxiliary length portions 15 and 16 are placed on the vehicle seat (not shown) and the adjustable belt bucket 41 attached to the buckle tab 42. After sitting on the vehicle seat the user positions the elastic length portion 12 over the abdomen and attaches the buckle tab 32 to the buckle 33. Proper longitudinal alignment of the elastic portion 12 is obtained by adjusting the lengths of nonelastic portions 14 and 15 with the adjustable buckles 33 and 41. The shoulder strap 24 is then passed over the user's shoulder and the hook 26 attached to the ring 27. A snug fit is obtained by adjusting the length of the shoulder strap 24 with the adjustment ring 29.

The use of individual belt length portions of substantially different elasticity is an extremely important feature of the invention. Because of its elastic qualities the center length portion 12 closely conforms to the curvature of the user's abdomen. This greatly increases the comfort with which the belt can be worn in addition to distributing over a relatively large area any deceleration forces generated by a collision involving the vehicle. By so distributing these forces the seat belt caused injury mentioned above can be avoided.

However, the use of the nonelastic length portions 13, 14, 15 and 16 is also significant since a belt composed along its entire length of relatively elastic material would not exhibit the overall nonelasticity required for a safety seat belt. Normally the belt must restrict movement of the user relative to the vehicle seat to a distance of less than 4 inches upon application of the maximum forces expected in an accident collision. This requirement can only be achieved if a substantial length portion of the safety belt is composed of a relatively nonelastic material.

Thus, in a test of preferred materials a 9-inch wide elastic length portion 12 stretched from a length of 12 inches to a length of approximately 16 inches after having been subjected to a longitudinal stress of 33 pounds for a period of 5 minutes. Conversely, a 2-inch wide and 12-inch long segment of nylon belting used for the nonelastic length portions 13, 14, 15 and 16 experienced an elongation of only about ⅛ inch after having been subjected to a longitudinal stress of 33 pounds for a period of 5 minutes.

The substantial difference in width between the elastic length portion 12 and the nonelastic length portions 13-16 is also an important feature of the invention. The relatively large width of the elastic portion 12 provides the greater wearing comfort and desired force distribution described above. Conversely, the relatively narrow width of the nonelastic length portions render the belt more easily managed and installed in addition to reducing the requirement for belting material.

However in utilizing length portions of different widths it is preferred that the nonelastic length portions be attached near the middle of the elastic length portion 12 and that the support bands 18 be attached between the laterally extended edges 21 of the elastic portion 12 and the nonelastic length portions 13 and 14. In this way longitudinal stress will be evenly distributed over the entire width of the elastic portion 12 insuring proper support to the user. The shoulder strap 24 is important in counteracting any tendency of the elastic portion 12 to roll or buckle during use.

Because the length of the elastic portion 12 which must accommodate the user's abdomen is small relative to the overall belt length, the use of the length adjusters on each side thereof is also desirable. This enables the user to center the elastic portion 12 in any desired position. For this purpose the use of a buckle tab 32 on the free end of one nonelastic portion 13 and an adjustable buckle 41 on the other nonelastic portion 14 is particularly desirable. With such an arrangement the central section of the seat belt can be used with a conventional seat belt already installed in a given vehicle. The tab 32 can be connected to the buckle of the installed belt and the buckle 41 connected to the buckle tab of the installed belt. Thus the requirement for a separate installation is eliminated and the cost for materials reduced.

Also, the bolt connectors 34 and 43 can be replaced by hook devices (not shown) suitable for attachment to the similar bolt connectors used with typical seat belts. This enables a user to install the present safety belt directly to the bolt connectors of a previously installed conventional seat belt.

A slight modification of the safety belt shown in the figure has proven useful in certain applications. This modified belt utilizes nonelastic length portions 13 and 14 and support bands 18 each of which overlap the central elastic portion 12 by a slightly greater length than shown. For example, an overlap for each of about 2 inches increased the degree of support provided by the central length portion 12 by reducing its effective elasticity.

Obviously, many modifications and variations of the present invention are possible in light of the above teachings. For example only, while the invention has been described for use by pregnant women it will be understood that others, especially those possessing a large girth, will find it useful. It is, therefore, to be understood that within the scope of the appended claims the invention may be practiced otherwise than as specifically described.

What is claimed is:

1. A safety device for use in vehicles and comprising an elongated restraining belt having a pair of relatively nonelastic length portions straddling and serially connected to a relatively elastic length portion of substantially shorter length than the combined lengths of said nonelastic length portions, connector means connected to at least one end of said elongated restraining belt and adapted to allow securement of said elongated restraining belt to the vehicle, and adjustment means for adjusting the overall length of said restraining belt.

2. A safety device according to claim 1 wherein the width of said relatively nonelastic length portion is substantially less than the width of said relatively elastic length portion.

3. A safety device according to claim 2 wherein said relatively nonelastic length portions are attached to the opposite ends of said relatively elastic portion so as to be in substantial alignment with the lateral midportion thereof.

4. A safety device according to claim 3 including support means attached between said relatively nonelastic length portions and the laterally extending edges of said relatively elastic length portion.

5. A safety device according to claim 4 including an adjustable shoulder strap connected between one of said relatively nonelastic length portions and the upper edge of said relatively elastic length portion.

6. A safety device according to claim 5 including adjustment means for adjusting the length of each said relatively nonelastic length portion so as to permit independent adjustment of the overall length of said restraining belt and the longitudinal position therein of said elastic length portion.

7. A safety device according to claim 1 including adjustment means for adjusting the length of each said relatively nonelastic length portion so as to permit independent adjustment of the overall length of said restraining belt and the longitudinal position therein of said elastic length portion.

8. A safety device according to claim 1 wherein the width of said relatively nonelastic length portion is substantially less than the width of said relatively elastic length portion.

9. A safety device according to claim 8 wherein said relatively nonelastic length portions are attached to the opposite ends of said relatively elastic portion so as to be in substantial alignment with the lateral midportion thereof.

10. A safety device according to claim 9 including support means attached between said relatively nonelastic length portions and the laterally extending edges of said relatively elastic length portion.

11. A safety device according to claim 10 including an adjustable shoulder strap connected between one of said relatively nonelastic length portions and the upper edge of said relatively elastic length portion.

12. A safety device according to claim 11 wherein said connector means comprises connectors on each free end of said relatively nonelastic length portions adapted to rigidly fix said restraining belt to the body of the vehicle and wherein the combined length of said relatively nonelastic length portions is substantially greater than the length of said relatively elastic length portion.

13. A safety device for use in vehicles and comprising an elongated restraining belt having a central length portion straddled by and serially connected to end length portions, said central length portion having a width adapted to accommodate the distended abdomen of a pregnant woman, said end length portions having widths substantially less than the width of said central length portion and ends adapted for securement to the vehicle, and means for adjusting the lengths of each and length portion so as to permit independent adjustment of the overall length of said restraining belt and the longitudinal position therein of said central length portion.

14. A safety device according to claim 13 wherein said end length portions are in substantially longitudinal alignment and said central length portion projects laterally a substantial distance on either side of said longitudinally aligned end length portions.

15. A safety device according to claim 14 including an adjustable shoulder strap adapted for connection between the upper edge of said central length portion and one of said end length portions.

References Cited by the Examiner

UNITED STATES PATENTS

| | | | |
|---|---|---|---|
| 1,172,103 | 2/1916 | Bennett | 297—385 |
| 1,923,001 | 8/1933 | Haga | 297—385 |
| 2,252,357 | 8/1941 | Shaw | 297—385 |
| 2,498,471 | 2/1950 | Williams | 297—384 X |
| 2,613,865 | 10/1952 | Rose | 182—3 |
| 2,651,446 | 9/1953 | Rose | 182—3 |
| 2,871,927 | 2/1959 | Materi | 297—385 |
| 3,181,530 | 5/1965 | Storey | 297—384 |

FRANK B. SHERRY, *Primary Examiner.*

JAMES T. McCALL, *Examiner.*